United States Patent [19]
Hara

[11] Patent Number: 5,507,705
[45] Date of Patent: Apr. 16, 1996

[54] VEHICLE CONTROL DEVICE

[75] Inventor: Mitsuo Hara, Haguri, Japan

[73] Assignee: Nippondenso Co., Ltd., Kariya, Japan

[21] Appl. No.: 416,576

[22] Filed: Apr. 4, 1995

[30] Foreign Application Priority Data

Apr. 11, 1994 [JP] Japan .................... 6-072057

[51] Int. Cl.[6] ................................ F16H 59/02
[52] U.S. Cl. ........................................ 477/408
[58] Field of Search ............................... 477/108

[56] References Cited

U.S. PATENT DOCUMENTS

| | | | |
|---|---|---|---|
| 4,709,595 | 12/1987 | Hayama | 477/108 |
| 4,933,859 | 6/1990 | Tsuyama | 477/108 |
| 4,982,805 | 1/1991 | Naitou et al. | 477/108 |
| 5,088,351 | 2/1992 | Miyake et al. | 477/108 |
| 5,129,475 | 7/1992 | Kawano et al. | 477/108 |
| 5,382,206 | 1/1995 | Oda et al. | 477/108 |

FOREIGN PATENT DOCUMENTS

| | | |
|---|---|---|
| 62-199534 | 9/1987 | Japan . |
| 63-46931 | 2/1988 | Japan . |
| 6-017684 | 1/1994 | Japan . |

*Primary Examiner*—Dirk Wright
*Attorney, Agent, or Firm*—Cushman, Darby & Cushman

[57] ABSTRACT

To control the speed reduction ratio SLIP of an automatic transmission and a throttle opening TA of a vehicle engine to minimize fuel consumption while satisfying the driving needs of the vehicle's driver, a target acceleration setting section sets a target acceleration GT based on a target speed VTX and an actual speed SPD selected by a target speed selection section. A target drive torque setting section sets a target drive torque TDRV based on an actual speed SPD and the target acceleration GT. The target drive torque TDRV set in this way is input to a speed reduction ratio control section, and the speed reduction ratio control section controls the speed reduction ratio SLIP and lockup state XLU of the automatic transmission so that the target drive torque TDRV is achieved and fuel consumption is minimized based on the target drive torque TDRV and the target speed VTX. A target throttle opening setting section computes and sets a target throttle opening TTA based on the actual speed SPD, the target acceleration GT, the speed reduction ratio SLIP and the lockup state XLU.

12 Claims, 16 Drawing Sheets

| TDRV<br>VTX | TDRV 1 | TDRV 2 | ......... |
|---|---|---|---|
| VTX 1 | GEAR11<br>XLU 11 | GEAR12<br>XLU 12 | ......... |
| VTX 2 | GEAR21<br>XLU 21 | GEAR22<br>XLU 22 | ......... |
| ⋮ | ⋮ | ⋮ | |

| GEAR \ XLU | ON | OFF |
|---|---|---|
| LOW | $K_P 1$ | $K_P 2$ |
| | $K_I 1$ | $K_I 2$ |
| 2nd | $K_P 3$ | $K_P 4$ |
| | $K_I 3$ | $K_I 4$ |
| 3rd | $K_P 5$ | $K_P 6$ |
| | $K_I 5$ | $K_I 6$ |
| 4th | $K_P 7$ | $K_P 8$ |
| | $K_I 7$ | $K_I 8$ |

| VTX \ SPD | SPD 1 | SPD 2 | ..... |
|---|---|---|---|
| VTX 1 | GT 11 | GT 12 | ..... |
| VTX 2 | GT 21 | GT 22 | ..... |
| | | | |

VEHICLE CONTROL DEVICE

CROSS-REFERENCE TO RELATED APPLICATION

This application is related to and claims priority from Japanese Patent Application No. Hei. 6-72057 filed Apr. 11, 1994, the contents of which are hereby incorporated by reference.

BACKGROUND OF THE INVENTION

1. Field of the Invention

This invention is directed to a vehicle-use control device including both an automatic transmission and a throttle control.

2. Description of the Related Art

In recent years there has been a strong desire expressed for a vehicle control system featuring an automatic transmission (hereinafter referred to as "AT") that minimizes fuel consumption volume (hereinafter referred to as "fuel consumption") while satisfying the driving needs of the vehicle's driver.

Existing vehicle control devices featuring an AT to minimize fuel consumption (or fuel consumption rate) have been disclosed in Japanese Patent Application Laid-Open No. Sho. 62-199534 and Japanese Patent Application Laid-Open No. Sho. 63-46931.

Japanese Patent application Laid-Open No. Sho. 62-199534 discloses a device for controlling engine torque and the speed reduction ratio of a stepless transmission from the engine's throttle opening, speed and torque so that the fuel consumption rate is minimum. Japanese Patent Application Laid-Open No. Sho. 63-46931 discloses a device for monitoring the speed reduction ratio of a stepless transmission to achieve minimum fuel consumption during normal driving and to control engine operation to minimize fuel consumption.

However, the invention disclosed in Japanese Patent Application Laid-Open No. Sho. 62-199534 achieves the minimum fuel consumption (fuel consumption rate) per unit torque. This does not always correspond to achieving the minimum fuel consumption per unit time.

For example, if the fuel consumption rate is f (g/PS.h), the engine torque is TE (kg.m) and the engine rotational speed is $N_e$ (rpm), the fuel consumption F (g/h) can be expressed by the following equation:

$$F = f \cdot 2\pi \cdot TE \cdot N_e/75.60 \text{ (g/h)} \quad [1]$$
$$= K \cdot f \cdot TE \cdot N_e$$

where K is a constant. As this equation shows, by taking a combination in which the product of the fuel consumption rate f and the engine torque TE and the engine rotational speed $N_e$ is minimum, fuel consumption is minimized. In other words, rather than obtaining the minimum fuel consumption rate (f, TE, $N_e$), a combination in which the fuel consumption rate f is not necessarily minimized but in which the engine torque TE and engine rotational speed are low (f, TE, $N_e$) can produce a lower product. As a result, it is not necessarily the case that a fuel consumption rate f which is minimized combined with the engine torque TE and the engine rotational speed $N_e$ produces the minimum fuel consumption.

Also, because the needs of the driver are mainly satisfied in terms of speed and acceleration, even if the target engine torque is achieved, the needs of the driver are not necessarily satisfied. With the device disclosed in Japanese Patent Application Laid-Open No. 63-46931, although it is possible to achieve minimum fuel consumption, because there is only control of the speed reduction of the transmission, there is the problem that, with changes in the speed reduction ratio, there is acceleration and speed reduction generated against the will of the driver (i.e., even when the driver is not operating the accelerator pedal). There is the additional problem that, during driving times other than normal driving (e.g., when accelerating or decelerating), there is no control of fuel consumption and thus no improvement of fuel consumption during acceleration and deceleration.

SUMMARY OF THE INVENTION

With the above problems in mind, a purpose of this invention is to provide a control device for a vehicle that includes an AT which minimizes fuel consumption while satisfying the driving needs of the driver.

According to a first aspect of the present invention as shown in FIG. 29, an automatic transmission transforms the motive power of the internal combustion engine and transfers this power to the wheels. An actual speed setting section detects the actual speed of the vehicle and a target speed setting section sets the target speed of the vehicle. A target acceleration setting section sets the target acceleration based on an actual speed detected with the actual speed detection section and the target speed set with the target speed setting section.

In this aspect of the invention, a target drive torque setting section sets the target drive torque to drive the wheels of the vehicle. An automatic transmission control section sets the speed reduction ratio and controls the automatic transmission so that the target drive torque is achieved and the fuel consumption volume is minimized based on the target drive torque set with the target drive torque setting section and the target speed set with the target speed setting section. A throttle opening control section controls the throttle opening based on the target acceleration set with the target acceleration setting section.

Also, a target speed selection section selects one target speed from multiple vehicle speeds set according to the multiple target speed setting section, and one of several target speed setting sections is used to set the target speed based on the accelerator pedal control input.

Further, the target acceleration setting section sets the speed according to which the value of the target acceleration increases in direct proportion to the difference between the actual speed detected by the actual speed detection section and the target speed set with the target speed setting section.

Moreover, the automatic transmission control section sets the speed reduction ratio based on a table compiled by selecting the speed reduction ratio for which the fuel consumption volume is smallest of the speed reduction ratios to achieve the target speed and the target drive torque.

Still further, a torque converter transmits the motive force of the internal combustion engine via a fluid to the automatic transmission, a lockup clutch installed transmits the motive force to the automatic transmission by mechanically joining an input axle to which the motive force of the internal combustion engine is transmitted and an output axle outputting to the automatic transmission, and a lockup clutch control section controls joining and release of the lockup clutch. The automatic transmission control section sets the speed reduction ratio and lockup clutch joining state so that the target drive torque can be achieved and the fuel consumption ratio is minimized based on the target torque set by the target drive torque setting section and the target speed set by the target speed setting section.

Yet further, the automatic transmission control device sets the speed reduction ratio based on a table compiled by selecting the speed reduction ratio for which the fuel consumption volume is smallest of the speed reduction ratios to achieve the target speed and the target drive torque. Also, the automatic transmission control section sets the speed reduction ratio using the actual speed detected by the actual speed detection section, instead of using the target speed set according to the target speed setting section.

Moreover, the target drive torque setting section sets the target drive torque to the target acceleration set according to the target acceleration setting section and the actual speed detected according to the actual speed detection section. Also, one of the multiple target speed setting section sets the target speed in which the vehicle is driven at a set speed, and one of the multiple target speed setting section sets the target speed so that the drive torque decreases if there is a slip on the drive wheel.

Thus, according to the above features it is possible to output the target torque and control the AC at a speed reduction ratio where the fuel consumption volume is minimum. It is also possible to control the throttle opening based on the target acceleration. As a result, it is possible to minimize fuel consumption while satisfying the driving needs of the driver. Furthermore, by compiling a table of the speed reduction ratio where it is possible to minimize fuel consumption while satisfying the driving needs of the driver, it is possible to reduce the computation load of the control device. Also, there is setting of the target speed and choice of the target speed most suited to the present driving conditions. It is thus possible to satisfy more fully the driving needs of the driver.

Furthermore, there is derivation of one of multiple vehicle speeds based on the accelerator control amount that best reflects the driving needs of the driver. It is thus possible to satisfy more fully the driving needs of the driver. Also, it is possible to set as the target speed the target speed during cruising control and the target speed during traction control, thus satisfying more fully the driving needs of the driver. Also, because the target vehicle acceleration is set according to the difference between the target speed and the actual speed, it is possible to obtain an acceleration that matches the needs of the driver.

Furthermore, it is possible to control the vehicle transmission at a speed reduction ratio where the driving needs of the driver are satisfied and the fuel consumption is minimum in a clutch lockup state. Thus, even with an AT including a lockup clutch, it is possible to obtain advantageous results. Also, there is compilation of a table of the speed reduction ratio where the driver's driving needs are satisfied and fuel consumption is minimum, and of the operational state of the lockup clutch, thus making it possible to reduce the computation load of the control device.

Furthermore, it is possible to control the AT at a speed reduction ratio where the driver's driving needs are satisfied from the target drive torque and actual speed and where the fuel consumption is minimum. As a result, it is still possible to more fully control fuel consumption compared to existing devices. Moreover, because the target drive torque is set using the target acceleration, it is possible to more fully satisfy the driving needs of the driver.

BRIEF DESCRIPTION OF THE DRAWINGS

The present invention will now be described by way of example, with reference to the accompanying drawings in which.

DETAILED DESCRIPTION OF THE PRESENTLY PREFERRED EXEMPLARY EMBODIMENTS

Next follows a description of preferred embodiments of the invention.

Figure 1:
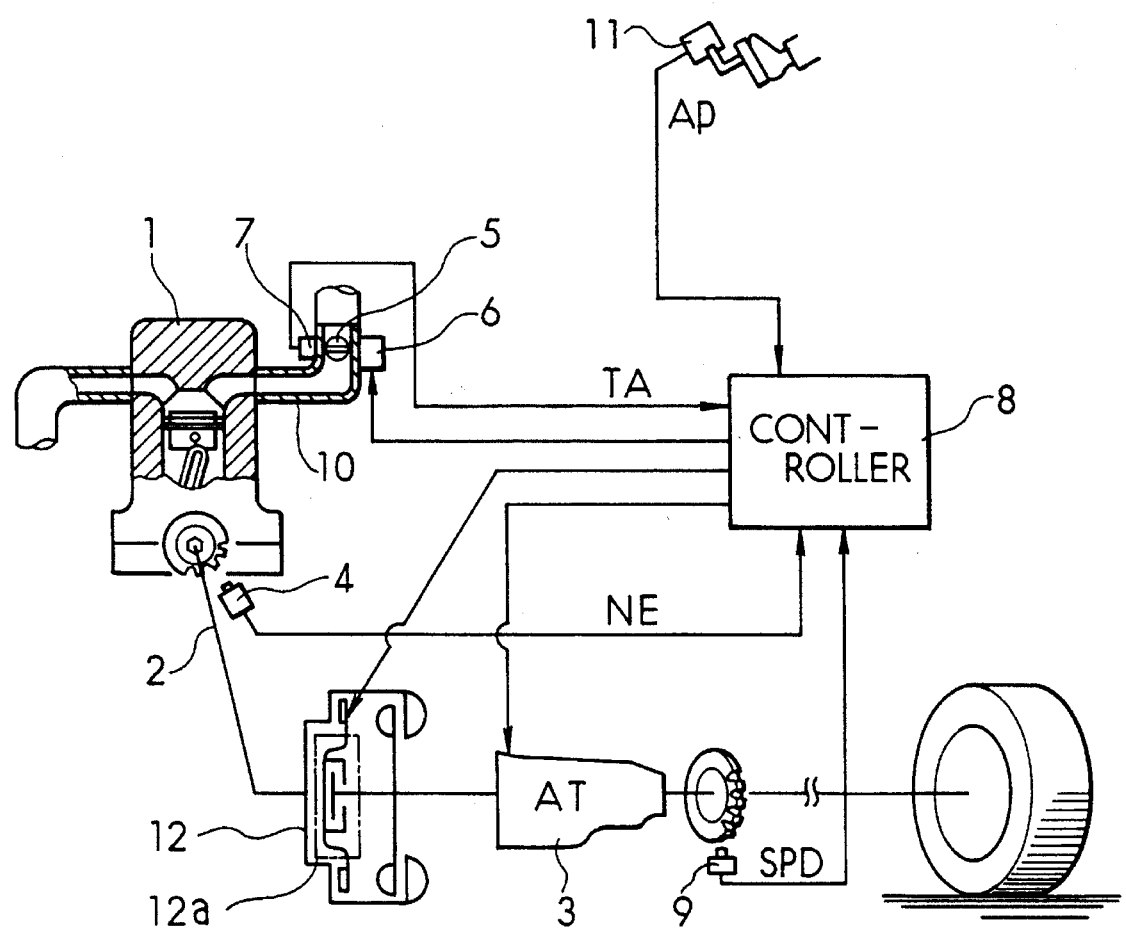
FIG. 1 is a system diagram of a control device according to a preferred embodiment of the present invention.

FIG. 1 is a simplified block diagram of a vehicle control device including an automatic transmission employing this invention.

The power generated by an engine 1 is input to a torque converter 12 via an output axle 2. Torque converter 12 transmits the power by use of a fluid. However, it is constructed so that it can mechanically transmit the axle output of engine 1 to an AT 3 directly by joining a lockup clutch 12a.

AT 3 has a structure in which it changes and outputs at the required speed reduction ratio and outputs the power that has passed through converter 12. Attached to the output axle of AT 3 is a rotational speed sensor 9 detecting the rotational speed NE of the output axle. A speed signal SPD based on the detection signals of rotational speed sensor 9 is input to a controller 8 composed of a microcomputer or the like.

Attached to engine 1 is a rotational speed sensor 4 to detect the rotational speed of the engine. Also, attached to an intake pipe 10 to send air to engine 1 is a throttle valve 5. There is also a throttle actuator 6 to adjust the opening of throttle valve 5 and a throttle opening sensor 7 to detect the opening. Throttle actuator 6 to control the throttle valve opening is controlled by the controller 8 based on detection signals (accelerator control input) from an accelerator pedal position sensor 11. The opening of the throttle 5 is not directly controlled by operation of the accelerator pedal but controlled electronically by the controller 8. The engine rotational speed signal NE based on detection signals from rotational speed sensor 4, an accelerator position signal $A_P$ and the throttle opening signal TA based on detection signals from throttle opening sensor 7 are input to the controller 8.

Figure 2:
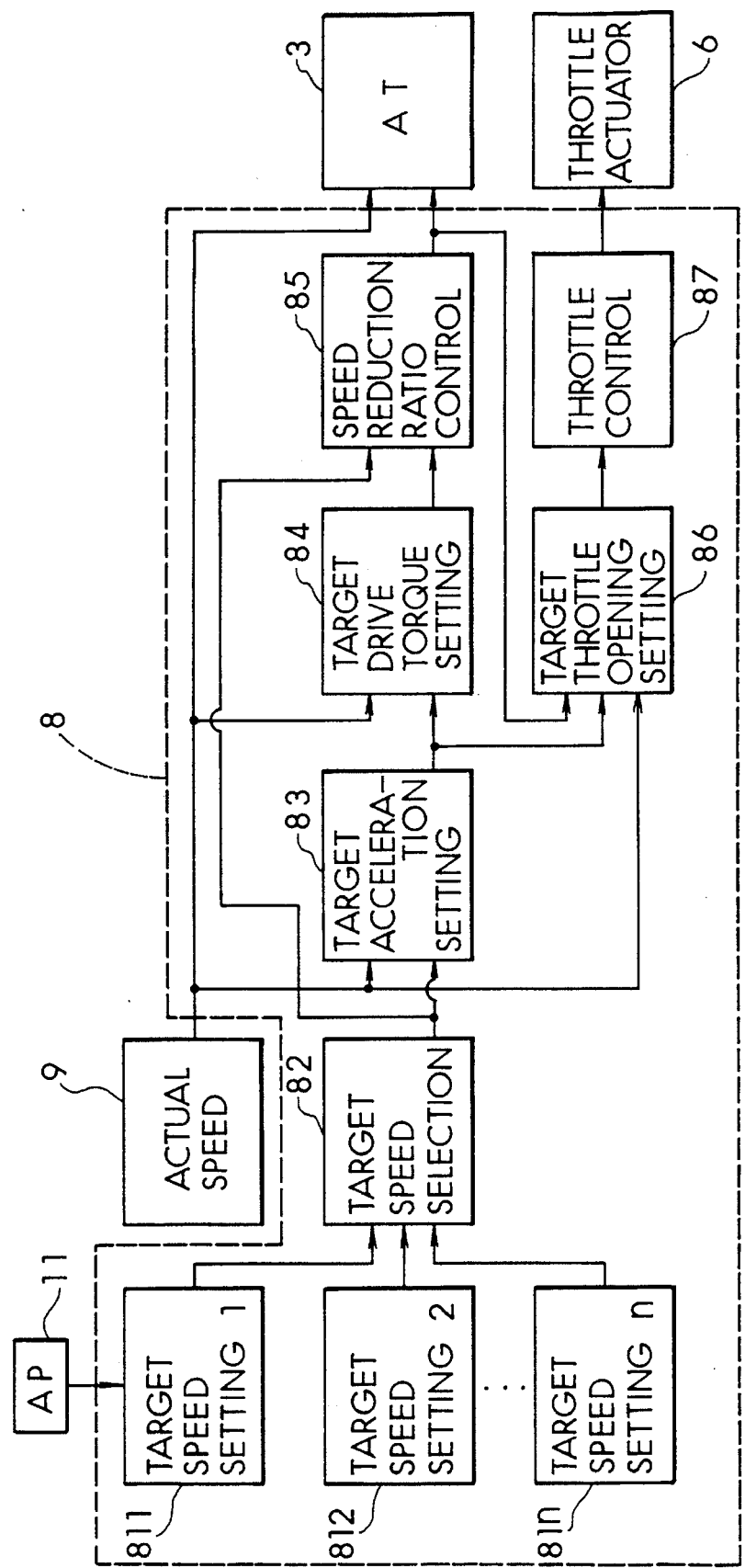
FIG. 2 is a block diagram showing the structure of the control device.

FIG. 2 shows in the form of a block diagram the processes executed by control device 8. The following is an explanation of the processes according to the block diagram of FIG. 2.

In FIG. 2 the target speed setting section 811 sets the target speed according to the acceleration control amount AF based on the detection signal $A_P$ from accelerator pedal position sensor 11. The target speed setting sections 812-81n set the target speed as described below based on the engine driving conditions (e.g., traction control, cruise control, etc.). The number of target speed setting sections can be set according to particular application requirements and there is no theoretical limit to the number of sections that can be used. The target speed selection section 82 is a section to select the target speed VTX for actual use according to driving conditions from the multiple target vehicle speeds set by the target speed setting sections 812-81n. The target speed selection section 82 is not necessary when there is only one target speed setting section, and can thus be eliminated in that case.

Next, the target acceleration setting section 83 sets the acceleration by computing the target acceleration GT based on the target speed VTX selected by the target speed selection section 82 and the actual speed SPD. In this embodiment the speed signal SPD based on the output from rotational speed sensor 9 as an actual speed detector is considered to be the actual speed SPD.

The target drive torque setting section 84 computes and sets the target drive torque according to the actual speed SPD detected by the actual speed detection section and the target acceleration GT set by the target acceleration setting section 83. The target drive torque TDRV set here is input to the speed reduction ratio control section 85. The speed reduction ratio control section 85 controls the speed reduction ratio and lockup state of AT 3 so that the target drive torque TDRV is achieved and the fuel consumption is minimized based on the target drive torque TDRV and the target speed VTX.

The target throttle opening setting section 86 computes and sets the target throttle opening TTA based on the actual speed SPD, the target acceleration GT, the speed reduction ratio and the lockup state. The throttle control section 87 controls the throttle actuator 6 based on the target throttle opening TTA.

Figure 3:
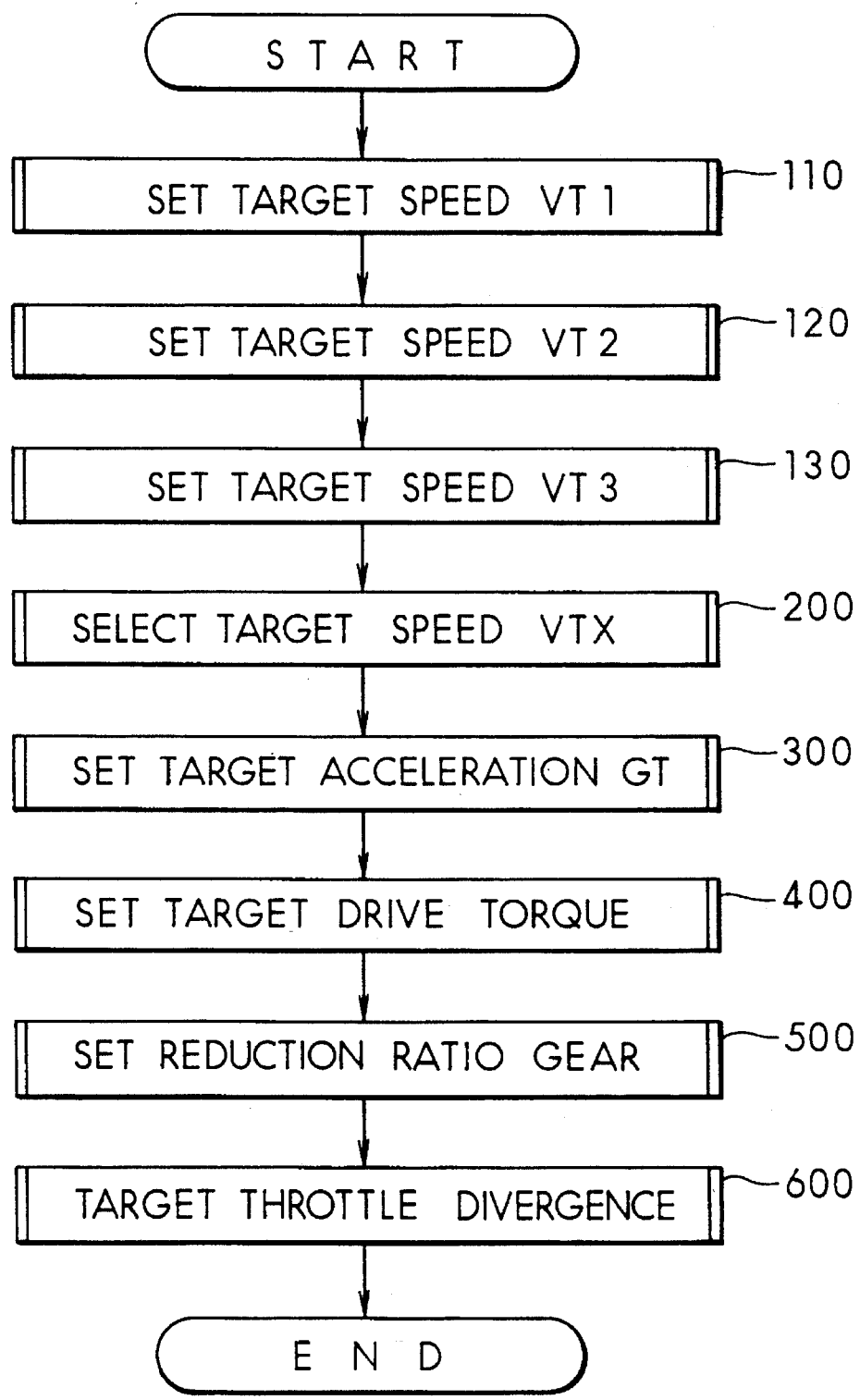
FIG. 3 is a flowchart showing a main routine implemented with the control device.

Next follows a detailed description of the processes implemented by the control device 8 based on the flowchart shown in FIG. 3. This process is carried out regularly at required time intervals (e.g., 10 ms).

If this process is implemented, the target speeds VT1–VT3 (in the case of three target speeds) are set in steps 110 to 130.

Figure 4:
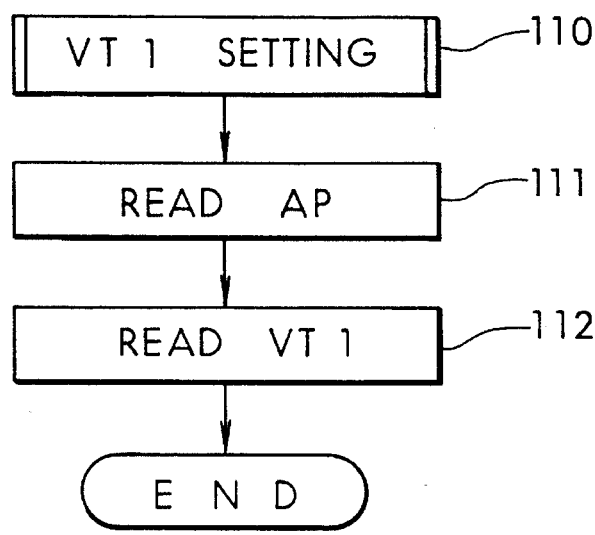
FIG. 4 is a flowchart showing a target speed setting process implemented with the control device.
Figure 5:
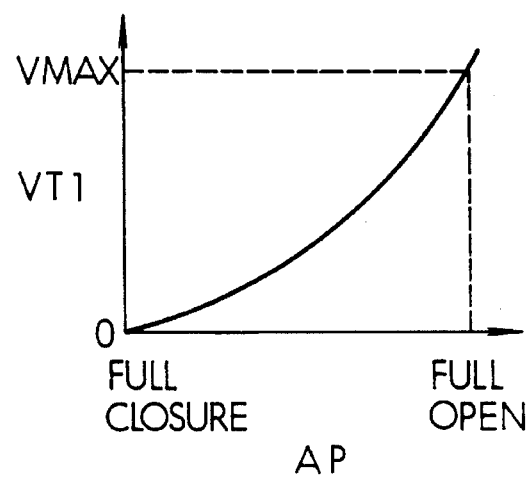
FIG. 5 is a correlation diagram showing the relationship between the accelerator control amount and the speed.

In step 110 of this embodiment, there is first setting of the target speed VT1 based on the acceleration control input AP according to the flowchart of the target speed setting process shown in FIG. 4. In other words, in step 111 in FIG. 4 there is reading of the accelerator position $A_P$. In the ensuing step 112 there is reading of the target speed VT1 based on the VT1 table shown in FIG. 5 to conclude this process. The process then proceeds to step 120 of FIG. 3. Here, the VT1 table shown in FIG. 5 is set so that it increases quadratically in accordance with an increase in the accelerator position $A_P$.

Figure 6A:
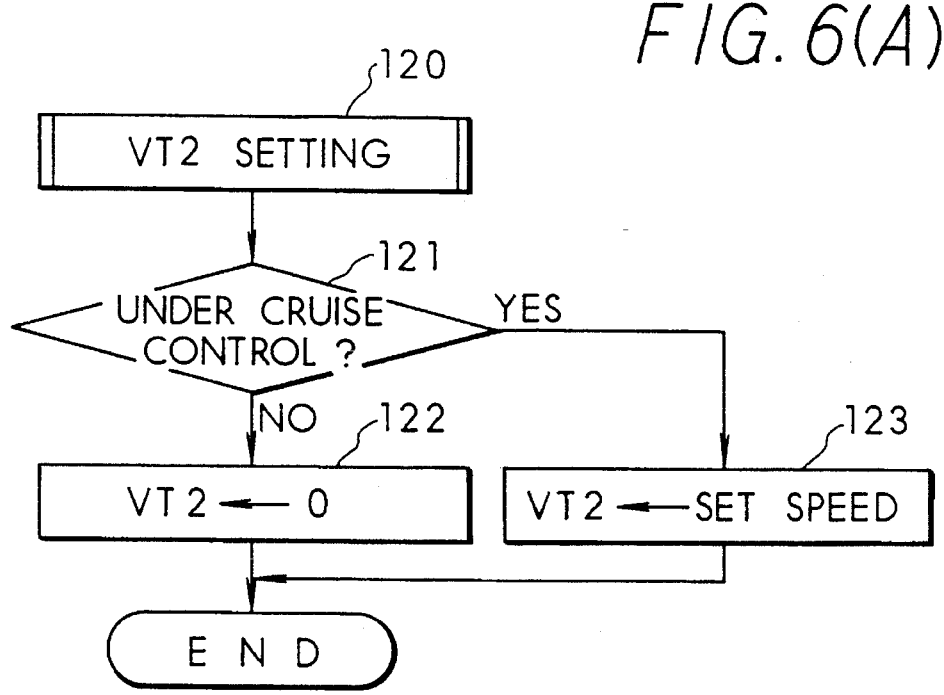
FIGS. 6(A) and 6(B) are flow charts showing a target speed setting process implemented with the control device.

Next, in step 120 there is derivation of a target speed VT2 based on a cruise control setting according to the flowchart of the target speed setting process as shown in FIG. 6(A). As is already known, "cruise control" means control of the vehicle to attain a speed set beforehand by the driver even when the driver releases the accelerator.

When this process is carried out, there is determination in step 121 whether cruise control is currently being implemented. This determination can be carried out, for example, according to the on/off state of a cruise control switch (not shown) controlled by the driver. If there is an affirmative determination, the process proceeds to step 123. During cruise control, a set speed which is set by the driver becomes the target speed VT2. If there is a negative determination in step 121, cruise control cannot be implemented in step 122 and the target speed VT2 is set as 0. This process is completed and the process proceeds to step 130 of FIG. 3.

Figure 6B:
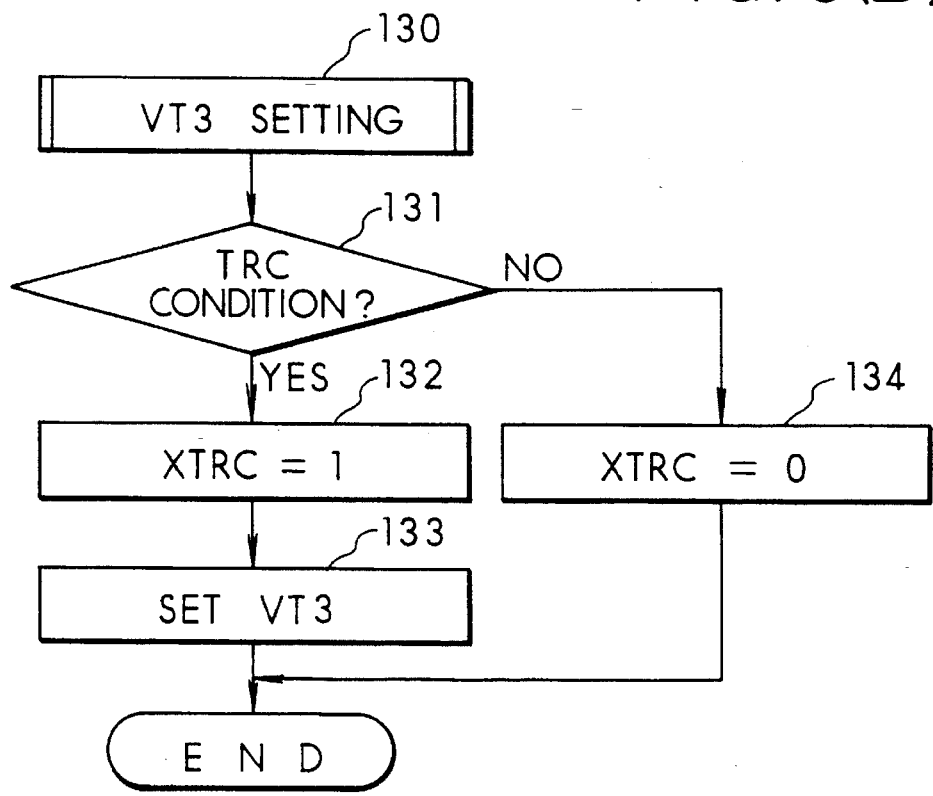

Next, in step 130 there is setting of the target speed VT3 based on the traction control (TRC) according to the flowchart for the target speed setting process in FIG. 6(B). Traction control, as is known, involves control of wheel slippage by suppressing drive torque if a slip should occur upon advancing the vehicle.

When this process is executed, in step 131 there is determination of whether the conditions for implementation of traction control have been fulfilled. The traction control implementation conditions are when the rotational speed of the drive wheel, for example, is faster than that of other wheels by a set value or greater. In such a case, the drive wheel is determined to be slipping and there is implementation of traction control. If it is determined in step 131 that the traction control implementation conditions have been satisfied, the process advances to step 132 and the traction control implementation flag XTRC is set to 1. Then, in step 133, there is setting of the target speed VT3 to reduce the torque and the process is completed. If there is a negative determination in step 131, the process proceeds to step 134 and the traction control implementation flag XTRC is set to 0 to complete the process, after which the process advances to step 200 of FIG. 3. In this embodiment the target speed is set according to the three methods described above, although it is also possible to make multiple settings according to other parameters.

Next, in step 200 of FIG. 3 there is implementation of the target speed selection process.

Figure 7:
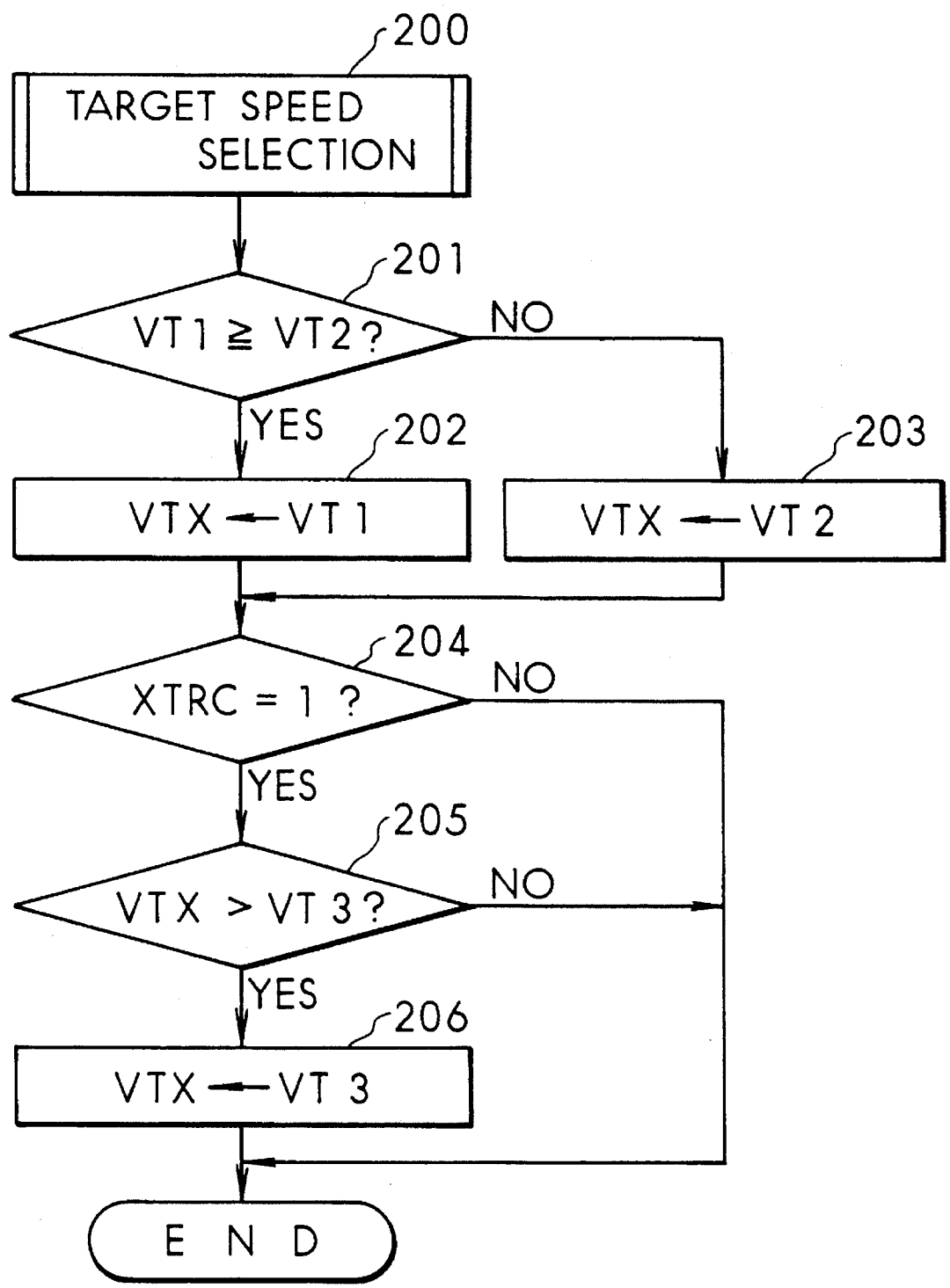
FIG. 7 is a flowchart showing a target speed selection process implemented with the control device.

In this embodiment, as is shown in the flowchart in FIG. 7, there is comparison in step 201 of target speed VT1 and target speed VT2, and in steps 202 and step 203 the larger value is selected to be the target speed VTX. The process then advances to step 204 to determine whether the above-mentioned traction control implementation flag XTRC is 1 or not. If not, the process establishes as the final target speed VTX the target speed VTX that was set in either step 202 or step 203. If XTRC=1, the process proceeds to step 205 where there is comparison of the target speed VTX just set and the target speed VT3 set in FIG. 6(B). If target speed VT3 is smaller than target speed VTX, the process proceeds to step 206 where there is setting of VT3 as the final target speed VTX to end the process. If target speed VT3 is greater than or equal to target speed VTX in step 205, the process is terminated.

By selecting the target speed VTX as described above, because the driver generally is not depressing the accelerator during cruise control, the target speed VT1 derived from the accelerator position becomes approximately 0. As a result, the target speed VT2 during cruise control is chosen as the target speed VTX. If the driver has depressed down the accelerator, the value of target speed VT1 as derived from the accelerator position is larger than the value of target speed VT2 during cruise control so that VT1 is chosen as the target speed VTX.

If traction control is being carried out, the lower target speed is chosen as the final target speed in step 205 and step 206, so that the target speed is set to reduce the torque. As a result, by choosing one target speed from multiple target vehicle speeds, the effects of traction control are not adversely affected.

In this way, upon finishing the processes in FIG. 3, step 200, the process proceeds to step 300.

Figure 8:
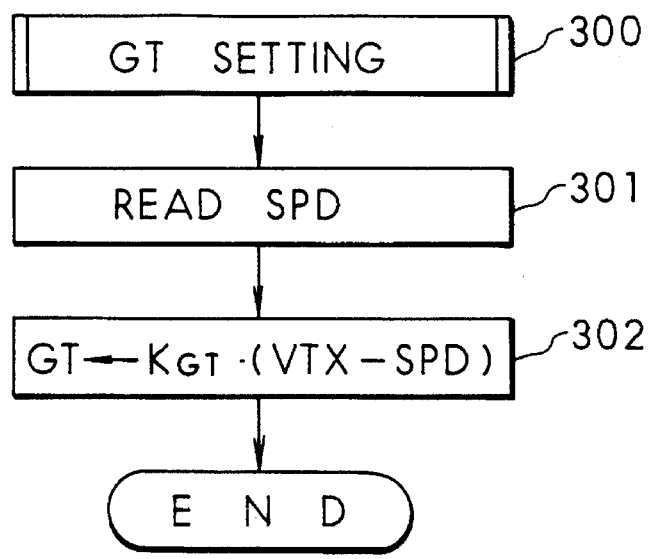
FIG. 8 is a flowchart showing a target acceleration setting process implemented with the control device.

In step 300, the target vehicle acceleration GT is computed and set. In this embodiment, the setting is carried out according to the flowchart shown in FIG. 8. When the target vehicle acceleration setting process in FIG. 8 is carried out, there is first reading of the actual speed SPD in step 301. In the following step 302 there is setting of the target vehicle acceleration GT according to the following equation:

$$GT = K_{GT} \cdot (VTX - SPD) \qquad [2]$$

Figure 9:
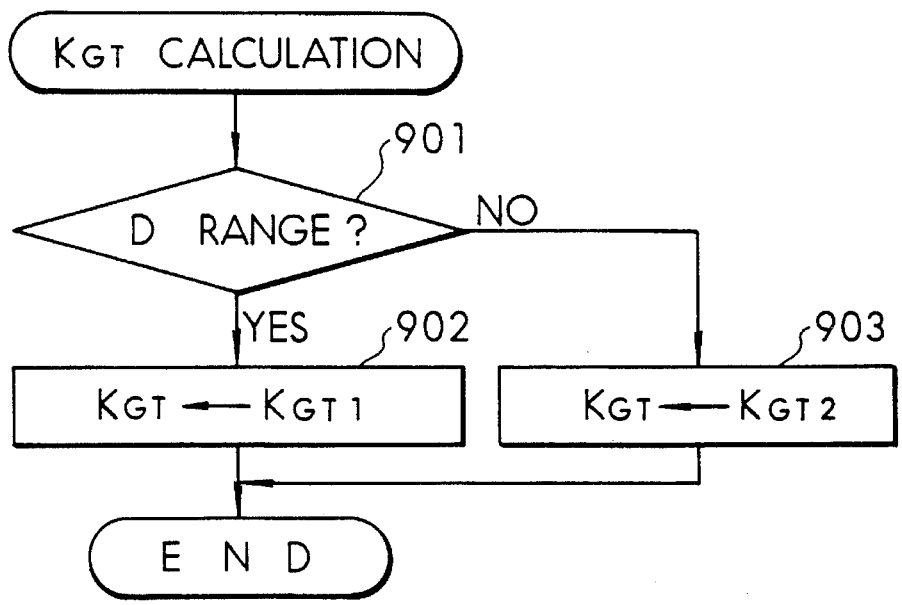
FIG. 9 is a flowchart showing a process of setting a coefficient $K_{GT}$ implemented with the control device.

Here, $K_{GT}$ is a constant that is obtained according to the flowchart in FIG. 9, for example. In step 901 in FIG. 9 there is determination whether the shift position is in the D (drive) range, that is, whether the vehicle is presently moving forward. If the vehicle is moving forward, the process proceeds to step 902. If the vehicle is not moving forward, the range position is considered to be R (reverse) range, and the process moves to step 903. In step 902 the forward constant $K_{GT1}$ is set as the constant $K_{GT}$. In step 903 the reverse constant $K_{GT2}$ is set as the constant $K_{GT}$ to complete the process. Moreover, in this embodiment the relationship is $K_{GT1} > K_{GT2}$ so that $K_{GT1}$ is $7.1 \times 10^{-4}$ and $K_{GT2}$ is $1.7 \times 10^{-4}$.

Figure 10:
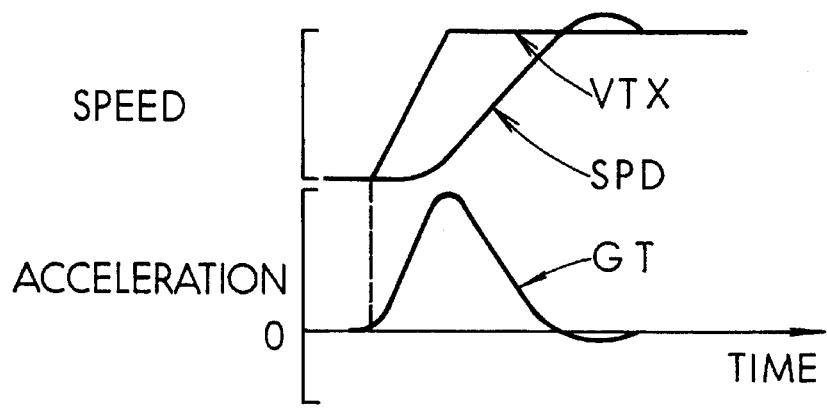
FIG. 10 is a time chart describing the relationship between the target speed, actual speed and target acceleration.

By setting the target acceleration GT as described above, if the deviation between the target speed VTX and the actual speed SPD is 0 as shown in FIG. 10, the target speed GT becomes 0, and when the deviation is large the target acceleration GT also becomes large. As a result, it is possible to provide an acceleration that corresponds to the actual driving needs of the driver. Also, in the embodiment, the constant $K_{GT}$ is divided into reverse time and forward time and set so that $K_{GT1} > K_{GT2}$. As a result there is no sudden start occurring in response to rough operation of the accelerator during reverse operation of the vehicle. In this way, when the target acceleration GT is set, the process proceeds to step 400 in FIG. 3.

In step 400 of FIG. 3, there is processing of the target drive torque setting.

First, the target drive torque is computed from the driving resistance R. The driving resistance R is computed from the sum of four elements: the roll resistance $R_r$, the air resistance $R_a$, the grade resistance $R_g$ and the acceleration resistance $R_i$.

The roll resistance $R_r$ is affected by such factors as the vehicle speed and the tire distributed load. However, it is generally considered to be primarily a function of the vehicle weight and can be approximated by the following equation in step 402:

$$R_r = \mu_r \cdot W \qquad [3]$$

where $\mu_r$ is the roll resistance coefficient and W is the vehicle total weight. The roll resistance coefficient $\mu_r$ also depends on the type of tire. The standard values for $\mu_r$ lie between 0.010 and 0.015.

The air resistance $R_a$ is computed by the following equation in proportion to the second power of the speed in step 403:

$$R_a = \mu_a \cdot A \cdot SPD^2 \qquad [4]$$

where $\mu_a$ is the air resistance coefficient, A is the total projected area, and SPD is the speed. The air resistance coefficient $\mu_a$ is the value obtained in a coasting test.

The grade resistance $R_g$ can be obtained with the following equation in step 404 if the incline angle of the chassis is considered to be $\Theta$:

$$R_g = W \cdot \sin \Theta \qquad [5]$$

The method of deriving the chassis incline angle will be described later.

The acceleration resistance $R_i$ can be derived by the following equation by using the acceleration G in step 405:

$$R_i = (1 + \phi) \cdot W \cdot G$$

where $\phi$ expresses the apparent weight increase rate. It is obtained by multiplying the inertial moment of the engine moment transmission system, axle and wheel by the weight of the effective radius of the drive axle and then dividing this value by the vehicle total weight W. However, it is extremely troublesome and difficult to derive the inertial moment from charts or vibration measurements, etc. For this reason, the approximate values found in the following table are used to derive the weight increase rate φ.

|  | Passenger Vehicle | Truck |
| --- | --- | --- |
| Including engine (acceleration properties test) | 0.08 | 0.10 |
| Not including engine (coasting, etc.) | 0.05 | 0.07 |

Figure 11:
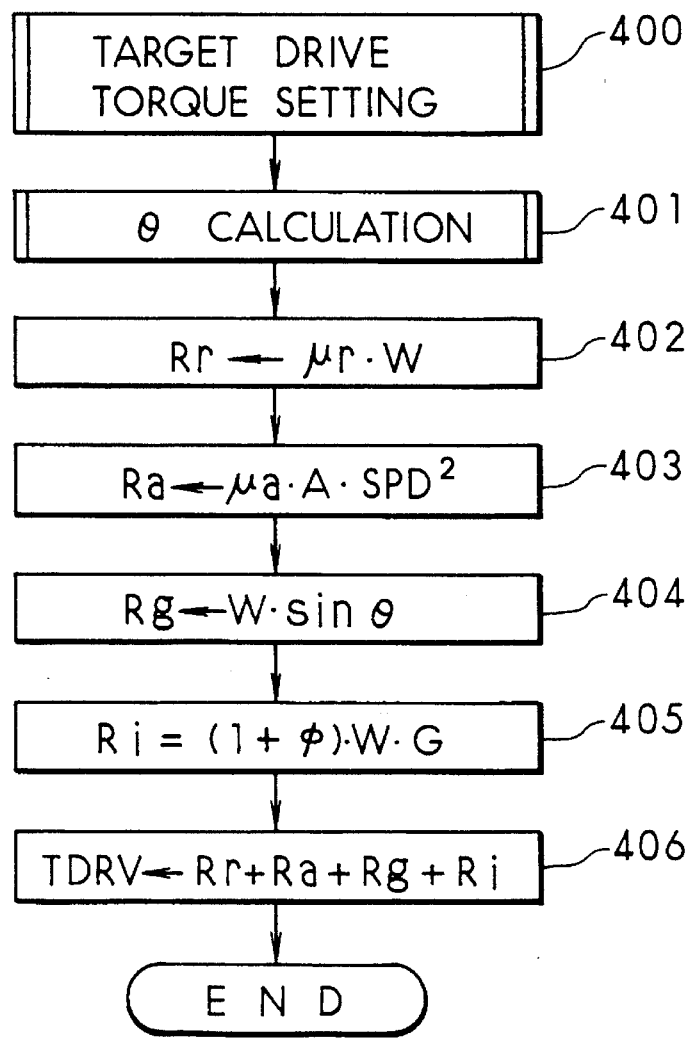
FIG. 11 is a flowchart showing a target drive torque setting process implemented with the control device.

Next, FIG. 11 shows the process of establishing the target drive torque from the driving resistance R described above (sum of the roll resistance $R_r$, the air resistance $R_a$, the grade resistance $R_g$ and the acceleration resistance $R_i$). The process is described with a flowchart. The flowchart in FIG. 11 corresponds to step 400 of FIG. 3.

When this process is executed, there is computation of the chassis incline angle Θ. In this embodiment, the chassis incline angle Θ is computed by taking advantage of the fact that the drive torque and the driving resistance balance each other out. Thus, the drive torque DRV is expressed as follows:

$$DRV = GEAR.TCNV.TE \quad [7]$$

where GEAR is the speed reduction ratio which is computed in step 500 of FIG. 3 to be described later (i.e., the present speed reduction ratio). TCNV is the torque ratio and TE is the engine torque.

As was mentioned above, the driving resistance R is expressed as follows:

$$R = R_r + R_a + R_g + R_i \quad [8]$$

Because the drive torque DRV and the driving resistance R are equal, the following relational expression is derived from Equations 6, 7 and 8:

$$\Theta = \sin^{-1}[\{DRV - (R_r + R_a + R_i)\}/W] \quad [9]$$

It is thus possible to obtain the incline angle Θ. Moreover, in this equation the roll resistance $R_r$ and the air resistance $R_a$ can be obtained by reading in the values derived in steps 402 and 403 of FIG. 11 described below. However, when deriving the acceleration resistance $R_i$ in step 405, because the target acceleration GT is being used as the acceleration G, it is necessary here to use the actual acceleration in obtaining the value $R_i$. If the actual acceleration is considered to be GB, the acceleration resistance $R_i$ can be obtained by the following equation:

$$R_i = (1+\phi).W.GB \quad [10]$$

The actual acceleration GB is obtained as follows by using the difference between the speed $SPD_{n-1}$ obtained in a previous calculation step and the speed $SPD_n$ obtained in the current step:

$$GB = (SPD_n - SPD_{n-1}) \times K_{GB} \quad [11]$$

where $K_{GB}$ is a constant that is derived as follows:

$$K_{GB} = 1000/(\Delta T.G) \quad [12]$$

where ΔT is the sampling time and G is the acceleration of gravity (9.8 m/s²).

Figure 12:
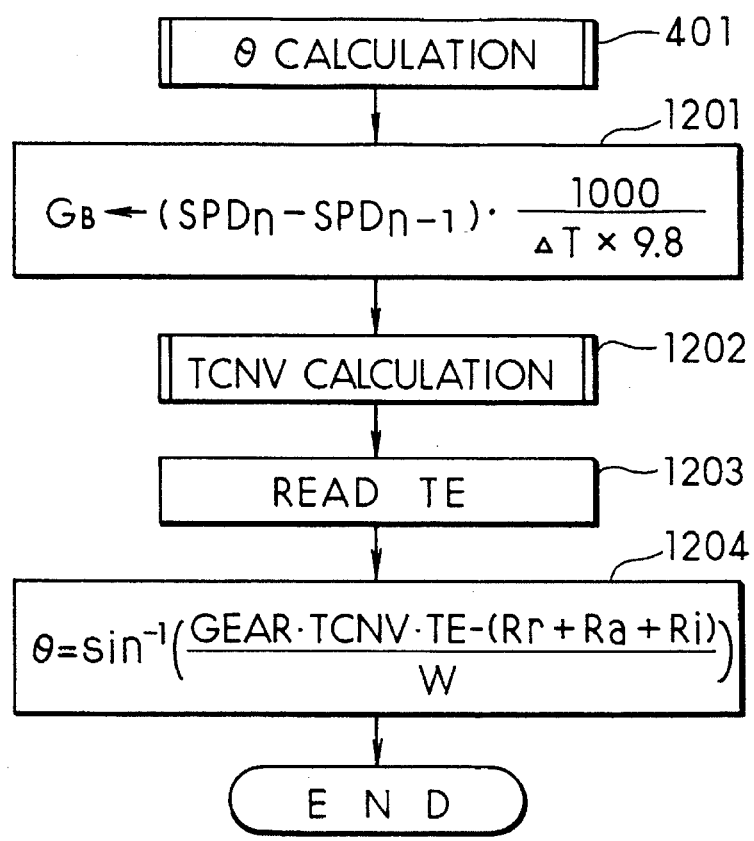
FIG. 12 is a flowchart showing an incline angle computation process implemented with the control device.

FIG. 12 is a flowchart showing the process to compute the incline angle Θ according to the principles described above. The following description will be based on FIG. 12.

Figure 13:
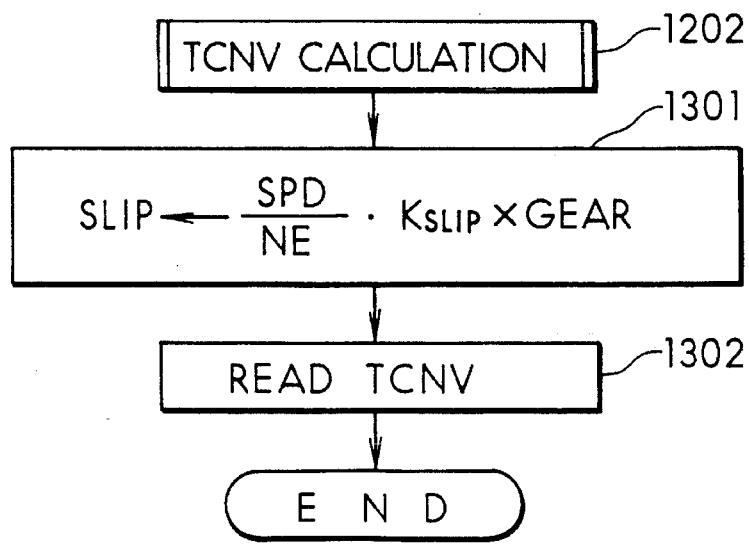
FIG. 13 is a flowchart showing a torque ratio computation process implemented with the control device.
Figure 14:
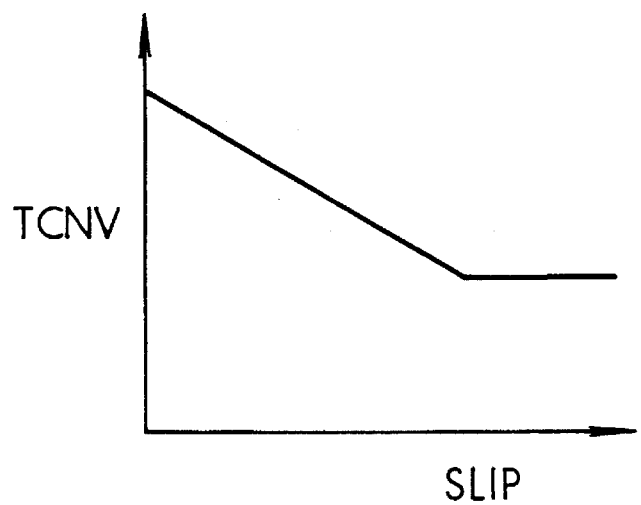
FIG. 14 is a correlation diagram showing the relationship between the speed ratio and torque ratio.

When this process is executed, there is computation of the actual acceleration GB by means of Equation 11 and Equation 12 in step 1201. In step 1202 there is computation of the torque ratio TCNV. FIG. 14 shows the relationship between the torque ratio TCNV and the speed ratio SLIP of the turbine input/output rotation speed of the torque converter. By deriving the speed ratio SLIP of the turbine input/output rotation speed it is possible to derive the torque ratio TCNV from FIG. 14. As FIG. 14 shows, the torque ratio TCNV decreases in inverse proportion to the speed ratio SLIP. FIG. 13 is a flowchart showing the routine for computing TCNV. The following description is based on FIG. 13.

If this process is executed, the speed ratio SLIP is computed with the following equation in step 1301.

$$SLIP = (SPD.K_{SLIP}.GEAR)/NE \quad [13]$$

where $K_{SLIP}$ is the speed ratio constant obtained by the following equation:

$$K_{SLIP} = 1000/(60.2\pi.r_D) \quad [14]$$

Here, $r_D$ is the effective radius of the drive tire. When the speed ratio SLIP is obtained with Equation 13 and Equation 14, the process moves to step 1302. In step 1302 there is reading of the torque ratio TCNV in relation to the speed ratio SLIP obtained in step 1301 based on the table shown in FIG. 14, and the process is completed. After the torque ratio TCNV is computed according to the above process, the process proceeds to step 1203 in FIG. 12.

Figure 15:
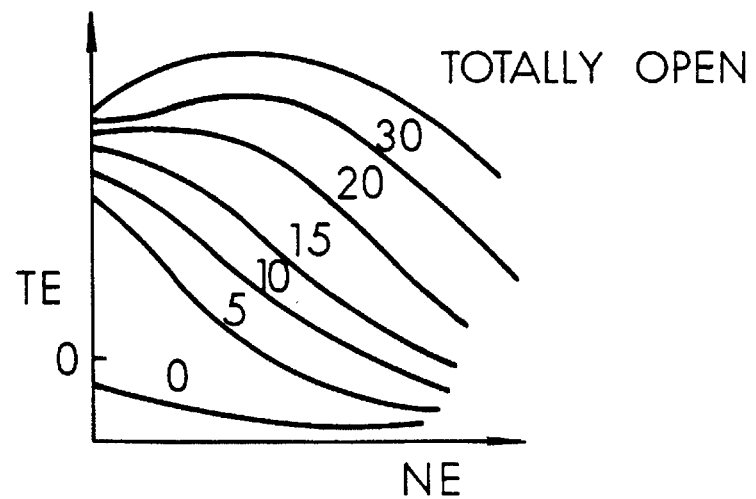
FIG. 15 is a correlation diagram showing the relationship between the engine rotational speed, the throttle opening and the engine torque.

In step 1203, the engine torque TE is derived. FIG. 15 shows the relationship between the engine torque TE, the engine rotational speed NE and the throttle opening TA. As shown in the Figure, the larger the engine rotational speed NE, the smaller the engine torque TE generally is. The larger the throttle opening TA, the larger the engine torque TE. Also, in this embodiment, there is derivation of the engine torque TE from the two-dimensional table of engine rotational speed NE and throttle opening TA which is based on the characteristics shown in FIG. 15.

In step 1204, the incline angle Θ is derived by the following equation:

$$\Theta = \sin^{-1}[\{GEAR.TCNV.TE - (R_r + R_a + R_i)\}/W] \quad [15]$$

where $R_i$ is the acceleration resistance computed by using the actual acceleration GB. It is obtained by the following equation:

$$R_i = (1+\phi).W.GB \quad [16]$$

The speed reduction ratio GEAR is the value computed in step 500 of FIG. 3 as described below.

The above processes are executed in step 401 of FIG. 11. When the incline angle Θ is derived in step 401, the process proceeds to step 402. In step 402, the roll resistance $R_r$ is obtained by Equation 3. In step 403 there is derivation of the air resistance $R_a$ with Equation 4. In step 404 there is derivation of the grade resistance $R_g$ by means of Equation 5 and the value Θ obtained in step 401. In step 405, the acceleration resistance $R_i$ is obtained with Equation 6. In step 406, the target drive torque TDRV is obtained with the following equation to end the process.

$$TDRV = R_r + R_a + R_g + R_i \quad [17]$$

The above processes are executed in step 4 of FIG. 3. When the processes in step 400 are finished, the process proceeds to step 500.

Figures 16, 17:
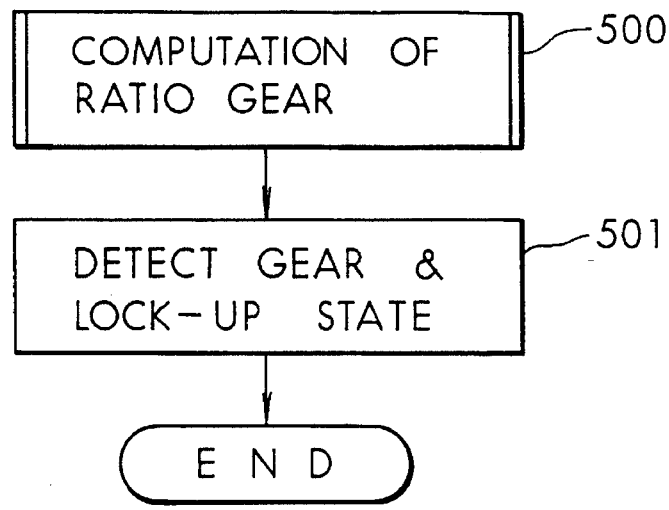
FIG. 16 is a flowchart showing a speed reduction ratio setting process implemented with the control device.
FIG. 17 is a correlation diagram used to set the speed reduction ratio and lockup state from the target drive torque and target speed.

In step 500 there is computation of the speed reduction ratio GEAR. FIG. 16 is a flowchart showing the process of setting the speed reduction ratio GEAR. If this process is executed, there is reading in step 501 of the speed reduction ratio GEAR and the lockup clutch on/off state XLU derived from the two-dimensional table shown in FIG. 17 and based on the target drive torque TDRV set in step 400 and the target speed VTX selected in step 200. This concludes the process, and the procedure progresses to step 600 of FIG. 3.

Figure 18:
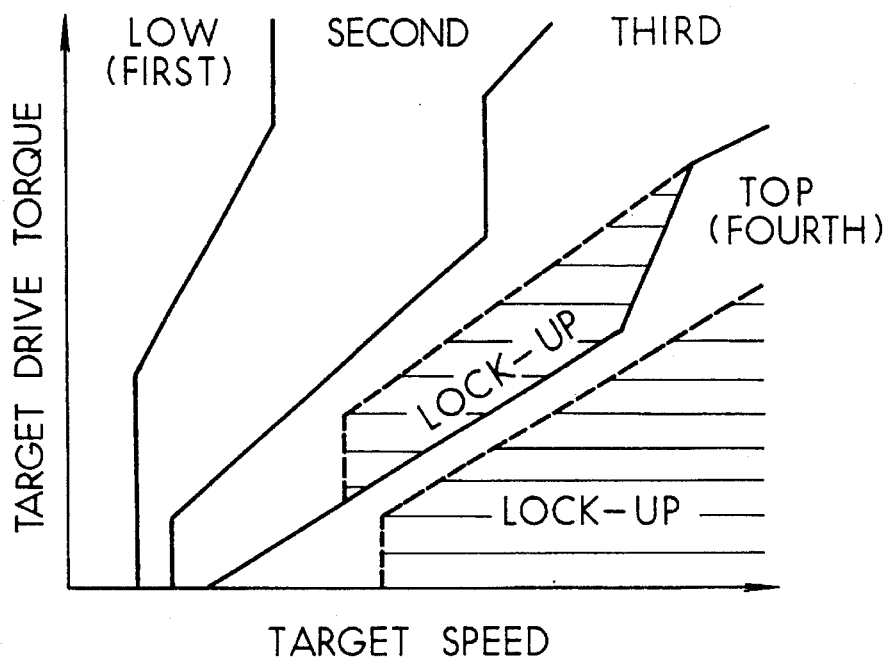
FIG. 18 is a characteristic diagram showing the characteristics of the speed reduction ratio and lockup state when minimizing fuel consumption.

Next follows a description of a method of compiling the two-dimensional table in FIG. 17 mentioned above, using the example of a 4-speed AT with the lockup clutch 12a. In this case, there are eight possible combinations depending on the speed reduction ratio and the on/off state of the lockup clutch 12a. However, among those combinations there are combinations where it is impossible to realize the target speed and target drive torque (due to over-rotation of the engine and insufficient engine torque, etc.). Thus, those examples are first eliminated from the possible combinations in the table. Next, regarding the remaining combinations, there is derivation of the fuel consumption, and the combinations for which that value is smallest are chosen as the table values. If the above operations are carried out regarding the various grid points for combinations of target drive torque TDRV and target speed VTX on the table, a obtain a characteristics chart roughly like that shown in FIG. 18 is obtained.

As the characteristics chart shows, there is setting to a gear position where the higher the target speed, the smaller the speed reduction ratio, and setting to a gear position where the higher the target drive torque, the higher the speed reduction ratio. As a result, if the target drive torque is small, when the target speed becomes high, there is immediate shifting up (changing to the gear with lower speed reduction ratio). Likewise, as is shown by the slanted lines in the figure, the lockup clutch is joined at low target drive torque and high target speed within the driving range of 3rd and 4th gear. There is no joining of the lockup clutch 12a in first and second gears because choking results if the lockup clutch 12a is joined at low speeds. The table shown in FIG. 17 is compiled according to this characteristics chart. Because the characteristics shown in FIG. 17 are the same as those in the characteristics chart in FIG. 18, description of those characteristics is omitted here for the sake of brevity.

Figure 19:
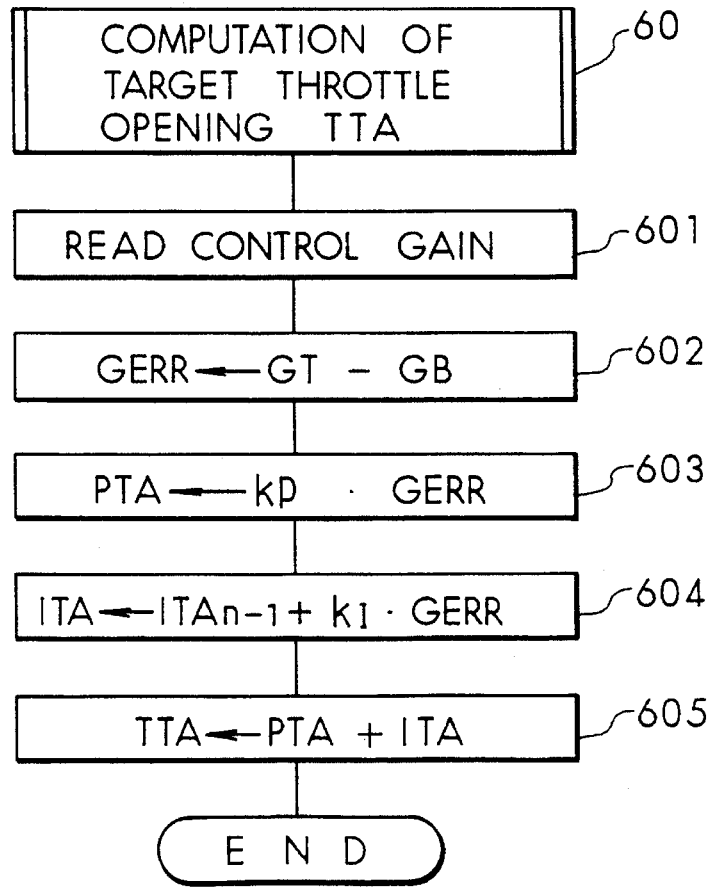
FIG. 19 is a flowchart showing a target throttle opening computation process implemented with the control device.

When the processes in step 5 of FIG. 3 are completed, the process proceeds to step 8 where there is computation of the target throttle opening TTA. The process of computing the target throttle opening is described according to the flowchart shown in FIG. 19. In this embodiment, there is computation of the target throttle opening TTA with proportional and integral control (PI control) according to feedback on acceleration.

Figures 20, 21, 22:
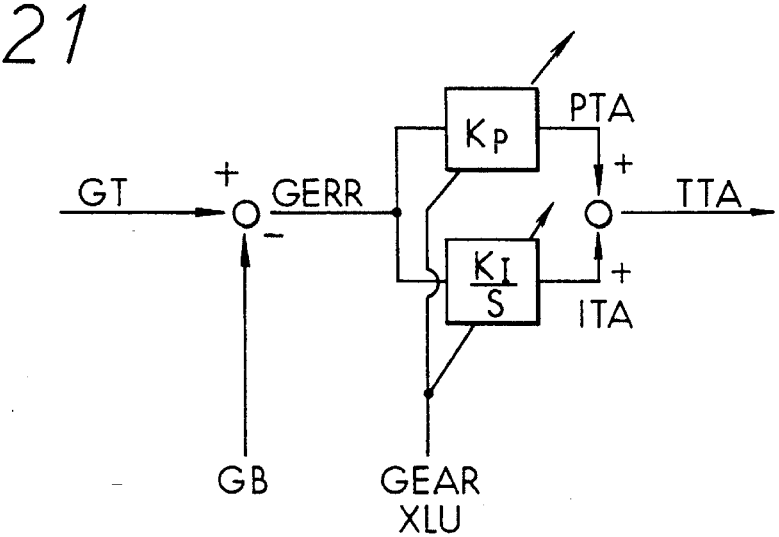
FIG. 20 is a table for obtaining the control gain from the lockup state and speed reduction ratio.
FIG. 21 is a control block diagram for describing the process of computing the target throttle opening.
FIG. 22 is a correlation diagram for showing the relationship between the actual speed, target speed, and target acceleration in a second embodiment of the present invention.

When this process is executed, there is derivation of the control gain $K_P$ for proportional control and the control gain $K_I$ for integral control based on a two-dimensional table of the speed reduction ratio GEAR and the lockup state XLU as shown in FIG. 20. This is set in such a way that the values decrease as the control gain goes from LOW (first gear) to fourth gear. It is also set in a way that the value is slightly smaller when the lockup clutch is joined than when it is released. As a result, in this embodiment, the settings are as follows: $K_P 1 < K_P 2 > \ldots > K_P 8$, $K_I 1 > K_I 2 > \ldots > K_I 8$. In this embodiment the value of the control constant is changed according to the locking state of the lockup clutch. However, it is not absolutely necessary to change the value, and memory can be saved by maintaining the same value.

Next, in step 602, the acceleration difference GERR is obtained from the target acceleration GT and the actual acceleration according to the following equation:

$$GERR = GT - GB \quad [18]$$

Next, in step 603, the proportional throttle control value PTA is derived according to the following equation:

$$PTA = K_P \cdot GERR \quad [19]$$

Then, in step 604, the integral throttle control amount ITA is obtained by the following equation.

$$ITA = ITA_{n-1} + K_I \cdot GERR \quad [20]$$

where $ITA_{n-1}$ is the former integral throttle control amount ITA.

Then, in step 605, the target throttle opening TTA is derived according to the following equation to complete this process.

$$TTA = PTA + ITA \quad [21]$$

Next follows a description of the method of computing the target throttle opening according to the control block diagram shown in FIG. 21.

When the target opening GT is input, there is reading of the actual acceleration GB and the difference with the target acceleration GT (acceleration difference) GERR is computed. Then, based on the acceleration GERR, the proportional throttle control amount PTA is obtained from the proportional control gain $K_P$, and the integral throttle control amount ITA is obtained from the integral control gain $K_I$. The proportional control gain $K_P$ and the integral control gain $K_I$ are obtained according to the speed reduction ratio GEAR and the lockup state XLU.

By adding the proportional throttle control amount PTA and the integral throttle control amount ITA it is possible to derive the target throttle control amount TTA.

Controller 8 controls the lockup clutch 12a of torque converter 12 and the gear position of AT 3 in order to obtain the speed reduction ratio GEAR and the lockup state XLU as computed in the above processes, and controls the throttle actuator 6 to obtain the target throttle opening.

By executing the controls described in the above embodiment, it is possible to minimize fuel consumption while satisfying the needs of the driver. It is especially possible to improve combustion during acceleration and speed reduction. Moreover, although there is multiple setting of the target speed in the above embodiment, it is not absolutely necessary to set multiple values. One target speed is sufficient.

Also, in the above embodiment, the target acceleration is set according to the difference between the target speed and actual speed. However, the method of setting the target acceleration is not limited to this method. It is also possible to set the value based on a target speed that reflects the demand of the driver. For example, it is also possible to create the two-dimensional table to derive the target acceleration from the target speed and actual speed as shown in FIG. 22, and read the target acceleration from the table when required. This table is compiled so that the target acceleration increases in accordance with the actual speed, and the target acceleration decreases in accordance with an increase in the target acceleration.

Also, when obtaining the target acceleration with Equation 1 in the above embodiment, the constant $K_{GT}$ can be changed according to driving conditions (shift position). However, a set value is also possible.

Figure 23:
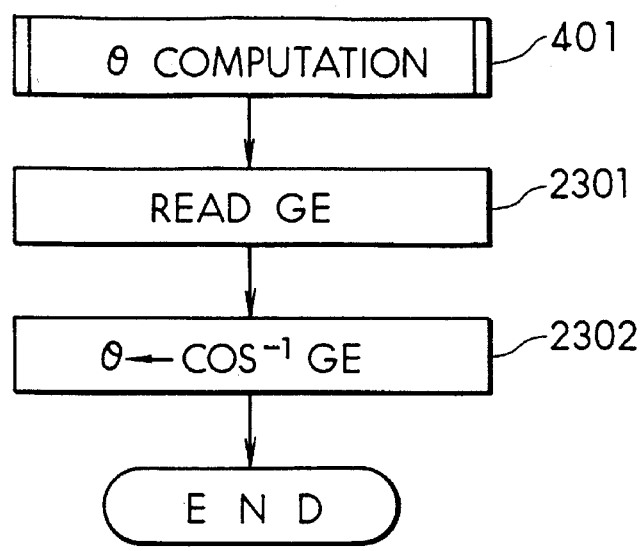
FIG. 23 is a flowchart showing an incline angle computation process implemented with the control device in the second embodiment.

Also, in the above embodiment, the vehicle incline angle Θ is derived from Equation 9 when computing the target drive torque. But it is not necessary to limit it to this method. For example, in the case of a vehicle including a G (acceleration) sensor to detect the acceleration in an upper and lower direction of the vehicle, it is possible to obtain the value according to the flowchart shown in FIG. 23.

The following is an explanation based on that flowchart. In step 2301 there is reading of the G-sensor output GE. In step 2302 the incline angle Θ is obtained with the following equation to complete the process.

$$\Theta = \cos^{-1} GE. \quad [22]$$

Figure 24:
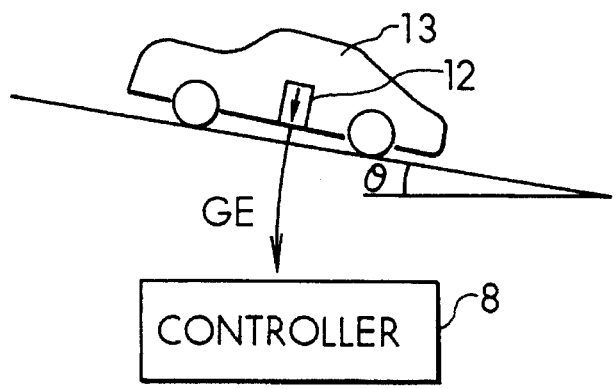
FIG. 24 is a descriptive diagram for explaining the principle of computing the incline angle in the second embodiment.
Figure 25:
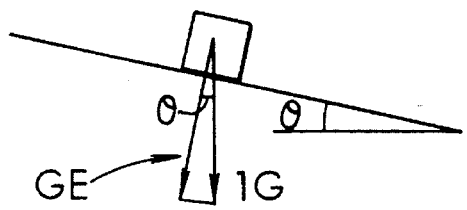
FIG. 25 is another descriptive diagram for explaining the principle of computing the incline angle in the second embodiment.

Next, FIG. 24 and FIG. 25 are used to explain the principle for computing the incline angle Θ. In FIG. 24 the G-sensor 12 attached to the vehicle 11 outputs the acceleration in a vertical direction to the vehicle, that is, in a vertical direction to the ground. The output signal is input to the controller 8. When the G sensor output has no acceleration in an up-down direction, there is output of a value corresponding to 1 G (gravitational acceleration) on level ground. However, when driving on an incline as shown in FIG. 25, the gravitational force on the vehicle is divided into force in an inclined vertical direction and force in an inclined horizontal direction. As a result, if the incline angle is Θ, it outputs a value corresponding to 1 G.cos Θ. As a result, if we assume the G sensor output to be GE when driving on a hill with an incline angle Θ, the output is provided by the following equation.

$$GE = \cos \Theta [G] \quad [23]$$

With this equation, it is understood that the incline angle Θ is obtained with Equation 22.

By obtaining the incline angle by the method described above, it is no longer necessary to compute the torque ratio TCNV and the engine torque TE, although G sensor is required.

Figure 26:
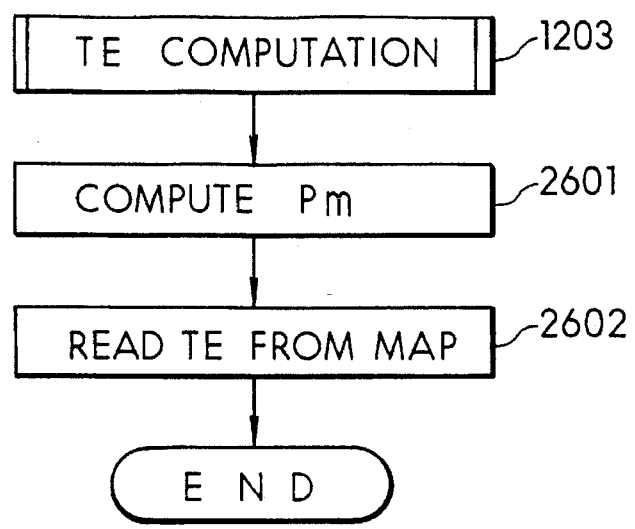
FIG. 26 is a flowchart showing an engine torque computation process implemented with the control device in the second embodiment.
Figure 27:
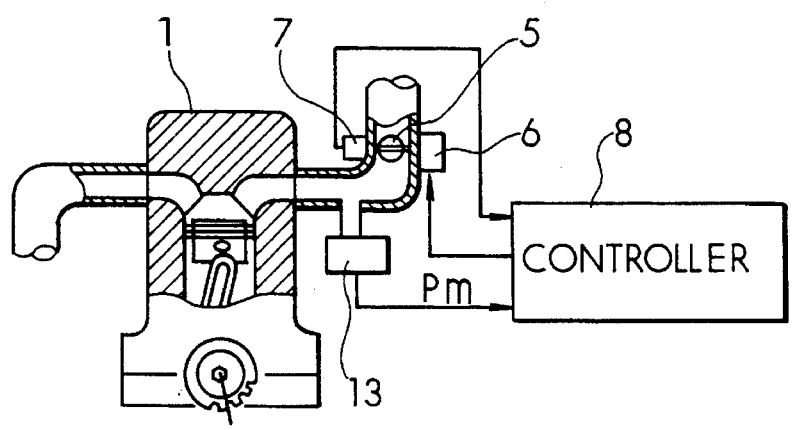
FIG. 27 is a structural diagram showing the system structure in the second embodiment.
Figure 28:
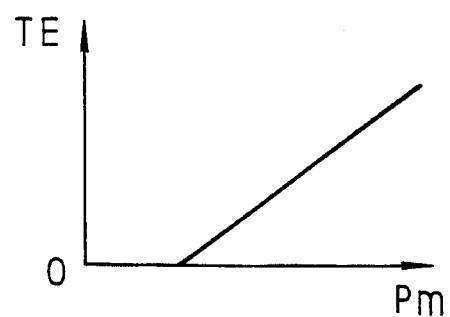
FIG. 28 is a correlation diagram showing the relationship between the intake pipe internal pressure and engine torque in the second embodiment.
Figure 29:
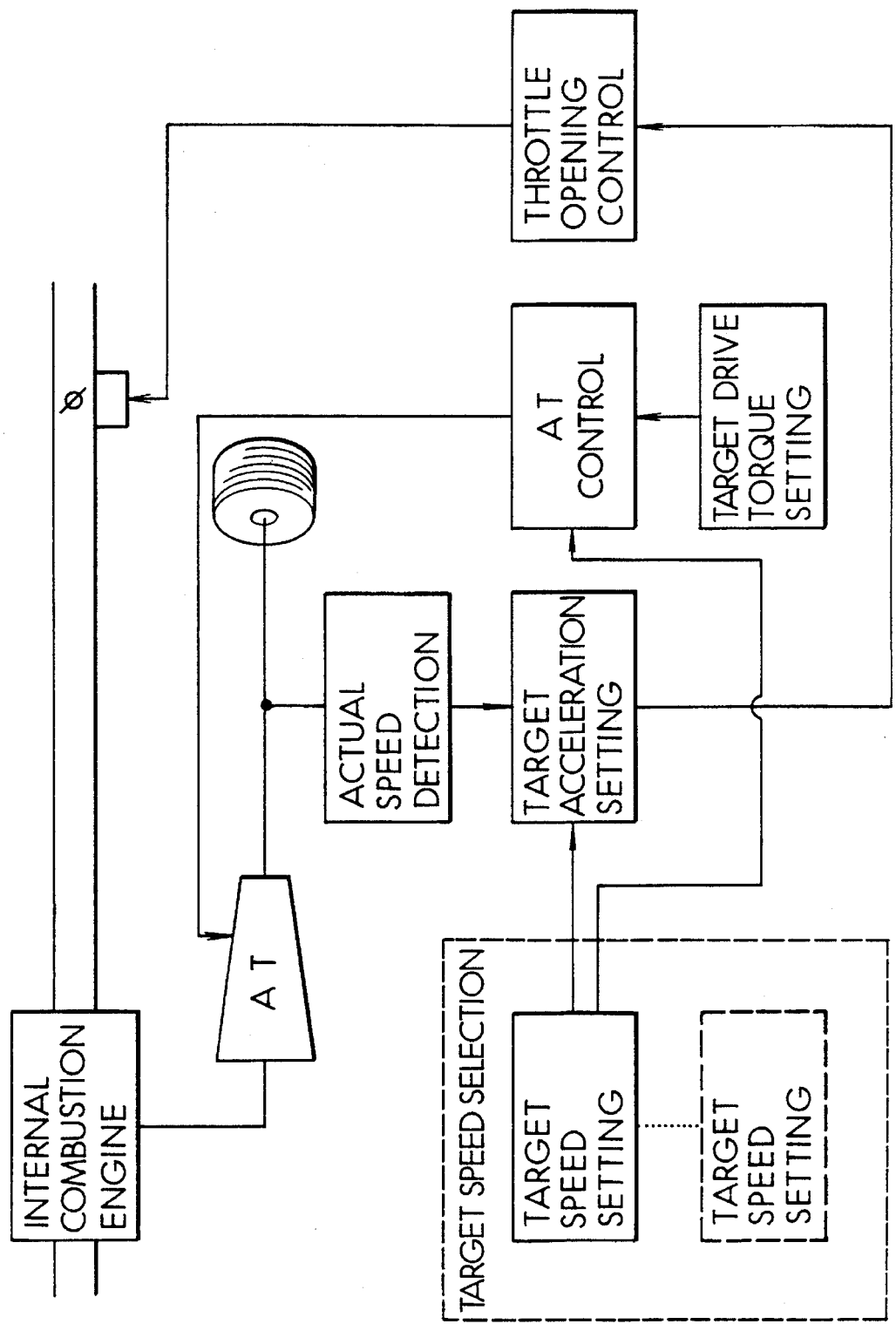
FIG. 29 is a block diagram showing the composite elements of an embodiment of this invention.

Also, when computing the engine torque TE to compute the target drive torque in the above embodiment there is derivation of a two-dimensional table of the engine rotational speed NE and the throttle opening TA. However, as shown in the flowchart in FIG. 26, it is also possible to derive this from the intake pipe internal pressure $P_m$. When the processes in FIG. 26 are carried out, there is computation in step 2601 of the intake pipe internal pressure $P_m$. As shown in FIG. 27, the intake pipe internal pressure Pm is detected by means of an intake pressure sensor 13 located at the downstream side of the throttle valve 5. It is also possible to estimate the value based on the operational conditions of the engine. In step 2602 the engine torque is read from a 2-dimensional table in relation to the intake pipe inner pressure $P_m$ based on the characteristics shown in FIG. 28. As shown in FIG. 28, the engine torque TE is proportional to the intake pipe inner pressure $P_m$. Thus, the method of computing the engine torque is not limited to the above embodiment but rather can be computed by several methods.

Also, in the above embodiment the speed reduction ratio was derived from the target drive torque and target speed. However, it can also be derived from the target torque and actual speed. Nevertheless, obtaining the speed reduction ratio using the target speed during transient times such as during acceleration will make it possible to achieve the target speed.

Furthermore, in the above embodiment, there was PI control of the target throttle opening based on the difference between the target acceleration and the actual acceleration. But this invention is not limited to this method. It is also possible to use a setting method that reflects the acceleration needs of the driver. Thus, it is possible to obtain the target throttle opening using modern control methods or fuzzy control methods.

Moreover, in the above embodiment, there was use of a multi-stage transmission with a lock-up clutch. However, it is also possible to use this invention in equipment without a lockup clutch or a stepless transmission.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A control system for a vehicle, said system comprising:
   a vehicle speed detector generating an output signal representative of a speed of said vehicle;
   target speed setting means for setting a target speed of said vehicle;
   target acceleration setting means, connected to said vehicle speed detector and said target speed setting means, for generating a target vehicle acceleration based on said vehicle speed detector output signal and said set target speed;
   a throttle opening controller controlling an opening degree of an engine throttle in the vehicle responsive to said target vehicle acceleration;
   target drive torque setting means for setting a target drive torque for wheels of said vehicle; and
   automatic transmission control means for, responsive to said set target speed and said set target drive torque, setting a speed reduction ratio in an automatic transmission of the vehicle and controlling the transmission to provide said set target drive torque while consuming a minimum volume of fuel.

2. The system of claim 1, wherein said target speed setting means comprises:
   a plurality of target speed setting units, each of said target speed setting units setting a candidate target speed for said vehicle; and
   target speed selection means for setting one of said plurality of candidate target speeds as said set target speed.

3. The system of claim 2, wherein one of said target speed setting units sets a candidate target speed responsive to a position of an accelerator pedal of said vehicle.

4. The system of claim 2, wherein one of said target speed setting units sets a candidate target speed responsive to a cruise control setting.

5. The system of claim 2, wherein said target speed selection means sets a smallest one of a candidate target speed and a traction control speed as said set target speed.

6. The system of claim 1, wherein said target acceleration setting means sets said target acceleration responsive to a difference between said vehicle speed and said target vehicle speed so that said target acceleration increases as said difference increases.

7. The system of claim 1, wherein said target acceleration setting means sets said target acceleration responsive to a drive/reverse state of said automatic transmission.

8. The system of claim 1, wherein said automatic transmission control means includes speed reduction ratio control means for setting said automatic transmission speed reduction ratio to a value among a plurality of possible speed reduction ratios which provides a minimum fuel consumption volume for said set target speed and said set target drive torque.

9. The system of claim 8, said speed reduction ratio control means including table lookup means for looking up said set speed reduction ratio from a table based on said set target speed and said set target drive torque.

10. The system of claim 8, wherein:

said automatic transmission includes a torque converter and a lockup clutch; and said speed reduction control means includes lockup clutch control means for controlling said lockup clutch to provide said minimum fuel consumption volume for said set target speed and said set target drive torque.

11. The system of claim 1, wherein said automatic transmission control means includes speed reduction ratio control means for setting said automatic transmission speed reduction ratio to a value among a plurality of possible speed reduction ratios which provides a minimum fuel consumption volume for said vehicle speed detector output signal and said set target drive torque.

12. The system of claim 1, wherein said drive torque setting means sets said target drive torque responsive to said set target acceleration and said vehicle speed detector output signal.

* * * * *